United States Patent
Okano et al.

(10) Patent No.: US 10,173,657 B2
(45) Date of Patent: Jan. 8, 2019

(54) VEHICLE BRAKING DEVICE

(71) Applicant: ADVICS CO., LTD., Kariya-shi, Aichi-ken (JP)

(72) Inventors: Takahiro Okano, Chiryu (JP); Masaki Ninoyu, Obu (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 143 days.

(21) Appl. No.: 15/110,629

(22) PCT Filed: Jan. 23, 2015

(86) PCT No.: PCT/JP2015/051927
§ 371 (c)(1),
(2) Date: Jul. 8, 2016

(87) PCT Pub. No.: WO2015/111732
PCT Pub. Date: Jul. 30, 2015

(65) Prior Publication Data
US 2016/0339887 A1 Nov. 24, 2016

(30) Foreign Application Priority Data
Jan. 24, 2014 (JP) .................................. 2014-011815

(51) Int. Cl.
*B60T 13/66* (2006.01)
*B60T 8/40* (2006.01)
(Continued)

(52) U.S. Cl.
CPC ............ *B60T 13/662* (2013.01); *B60T 7/042* (2013.01); *B60T 8/4077* (2013.01); *B60T 11/18* (2013.01); *B60T 13/147* (2013.01); *B60T 13/686* (2013.01)

(58) Field of Classification Search
CPC ..... B60T 13/662; B60T 13/686; B60T 13/147; B60T 7/042; B60T 8/4077; B60T 11/18
See application file for complete search history.

(56) References Cited

U.S. PATENT DOCUMENTS

| | | |
|---|---|---|
| 2011/0285199 A1 | 11/2011 | Ishida |
| 2014/0265546 A1 | 9/2014 | Shimizu et al. |

(Continued)

FOREIGN PATENT DOCUMENTS

| | | |
|---|---|---|
| JP | 2011-240873 A | 12/2011 |
| JP | 2013-193619 A | 9/2013 |

(Continued)

OTHER PUBLICATIONS

International Search Report (PCT/ISA/210) dated Apr. 21, 2015, by the Japanese Patent Office as the International Searching Authority for International Application No. PCT/JP2015/051927.

(Continued)

*Primary Examiner* — Vishal R Sahni
(74) *Attorney, Agent, or Firm* — Buchanan Ingersoll & Rooney PC (57) ABSTRACT

Provided is a braking device capable of suppressing an overshoot or undershoot in output pressure. This vehicle braking device is configured such that a pressure adjustment unit has a piston which is driven by the difference between force corresponding to pilot pressure and force corresponding to output pressure, and a control unit estimates, on the basis of a stroke-related value regarding the amount of movement of the piston, the amount of change of the output pressure that changes even after switching from pressure increase control or pressure reduction control to holding control of the output pressure, and controls a valve unit on the basis of the estimated amount of change of the output pressure.

18 Claims, 5 Drawing Sheets

(51) Int. Cl.
*B60T 7/04* (2006.01)
*B60T 11/18* (2006.01)
*B60T 13/14* (2006.01)
*B60T 13/68* (2006.01)

(56) References Cited

U.S. PATENT DOCUMENTS

| | | |
|---|---|---|
| 2015/0015061 A1 | 1/2015 | Masuda et al. |
| 2015/0069828 A1 | 3/2015 | Ueno et al. |
| 2015/0120161 A1* | 4/2015 | Kamiya .................. B60T 7/042 701/70 |

FOREIGN PATENT DOCUMENTS

| | | |
|---|---|---|
| JP | 2013-209051 A | 10/2013 |
| WO | WO 2013/175628 A1 | 11/2013 |

OTHER PUBLICATIONS

Written Opinion (PCT/ISA/237) dated Apr. 21, 2015, by the Japanese Patent Office as the International Searching Authority for International Application No. PCT/JP2015/051927.

* cited by examiner

VEHICLE BRAKING DEVICE

TECHNICAL FIELD

The present invention relates to a vehicle braking device.

BACKGROUND ART

A conventional vehicle braking device includes a master cylinder, an output piston that is driven by a force corresponding to fluid pressure in a servo chamber to change the capacity of a master chamber, an input piston that defines a first fluid pressure chamber filled with brake fluid between the input piston and the output piston, the input piston cooperating with a braking operation member, a mechanical servo pressure generation unit that outputs a fluid pressure corresponding to fluid pressure inputted to a pilot chamber to the servo chamber, and a pilot pressure generation unit that generates a fluid pressure corresponding to an inputted control signal to the pilot chamber. Such vehicle braking device is described in Japanese Unexamined Patent Publication No. 2011-240873.

As an example of the mechanical servo pressure generation unit, a mechanical regulator that generates a fluid pressure corresponding to a pilot pressure in a servo chamber based on an accumulator pressure in an accumulator is described in Japanese Unexamined Patent Publication No. 2013-193619.

As described above, some vehicle braking devices include the pressure adjustment unit that outputs the output pressure corresponding to the pilot pressure inputted to the pilot chamber to the servo chamber. Basically, the pressure adjustment unit includes a piston driven by a difference between a force corresponding to the pilot pressure and a force corresponding to the output pressure, and the capacity of the pilot chamber changes with movement of the piston.

PRIOR ART DOCUMENT

Patent Document

Patent document 1: Japanese Unexamined Patent Publication No. 2011-240873
Patent document 2: Japanese Unexamined Patent Publication No. 2013-193619

SUMMARY OF THE INVENTION

Problems to be Solved by the Invention

Inventor found a point to be improved (problem) in a braking device provided with the pressure adjustment unit. That is, when the actual output pressure substantially reaches a target pressure, and control to set flow rate of fluid inputted to and outputted from the pilot chamber to 0 (holding control to hold the output pressure) is performed, the piston moves despite of the flow rate of 0, causing overshoot or undershoot, which means that the actual output pressure deviates from the target pressure.

The present invention is devised in consideration of such situations, and its object is to provide a braking device capable of suppressing overshoot or undershoot of the output pressure.

Means for Solving the Problems

A vehicle braking device according to a first aspect of the present invention includes a pressure adjustment unit that outputs an output pressure corresponding to a pilot pressure inputted to a pilot chamber to an output chamber; a valve unit that adjusts pressure or flow rate of fluid inputted to and outputted from the pilot chamber; and a control unit that controls the valve unit according to an operation amount of a braking operation member. The pressure adjustment unit has a piston driven by a difference between a force corresponding to the pilot pressure and a force corresponding to the output pressure. The control unit estimates, on the basis of a stroke-related value regarding an amount of movement of the piston, an amount of change in the output pressure that changes even after switching from pressure increase control or pressure decrease control to holding control of the output pressure, and controls the valve unit on the basis of the estimated amount of change in the output pressure.

When the holding control is performed, that is, the opened valve unit is closed to set the flow rate of fluid inputted to and outputted from the pilot chamber to 0, the pilot chamber is sealed. After the amount of fluid inputted to and outputted from the pilot chamber becomes 0 by the sealing, the piston moves such that the flow rate of fluid inputted to and outputted from the output chamber becomes 0. This phenomenon changes the capacity of the pilot chamber, in turn, the pilot pressure. As a result, overshoot or undershoot of the output pressure occurs. The deviation of the actual pressure from the target pressure is related to a stroke of the piston at the time when the pilot chamber is sealed.

According to the first aspect, noting the stroke of the piston, an amount of change in the output pressure after switching to the holding control is estimated using a stroke-related value related to the stroke, and the estimated amount of change is reflected on brake control. By estimating the amount of change in the output pressure, control can be performed in consideration of the amount of change. Therefore, deviation between the actual output pressure and the target pressure can be suppressed to suppress overshoot or undershoot.

The vehicle braking device according to a second aspect of the present invention, in the first aspect, further includes a high pressure source that stores a predetermined range of fluid pressure; and a low pressure source that stores a fluid pressure lower than the fluid pressure stored in the high pressure source. The valve unit has a pressure increase electromagnetic valve that adjusts flow rate of fluid inputted from the high pressure source into the pilot chamber, and a pressure decrease electromagnetic that adjusts flow rate of fluid outputted from the pilot chamber to the low pressure source. The stroke-related value includes the pilot pressure, the output pressure, pressure of the high pressure source, and stiffness of the pilot chamber.

With this configuration, since the stroke-related value includes pressure and stiffness that are actually related to move the piston, the amount of change can be estimated in line with the actual state of the pressure adjustment unit.

The vehicle braking device according to a third aspect of the present invention, in the first aspect, further includes a high pressure source that stores a predetermined range of fluid pressure; and a low pressure source that stores a fluid pressure lower than the fluid pressure stored in the high pressure source. The valve unit has a pressure increase electromagnetic valve that adjusts flow rate of fluid inputted from the high pressure source into the pilot chamber, and a pressure decrease electromagnetic valve that adjusts flow rate of fluid outputted from the pilot chamber to the low pressure source. The control unit calculates the stroke-related value by a relational expression that is proportional to a difference between the pilot pressure and the output pressure and is inversely proportional to a difference between pressure of the high pressure source and the output pressure.

With this configuration, the stroke-related value is calculated by substituting the pressure actually related to the force for moving the piston into a stroke-related relational expression according to laws of physics. Therefore, the stroke can be accurately estimated, and the amount of change in the output pressure can be also accurately estimated.

With the vehicle braking device according to a fourth aspect of the present invention, in the second or third aspect, the control unit calculates the pilot pressure by multiplying the output pressure by a predetermined pressure ratio.

With the vehicle braking device according to a fifth aspect of the present invention, in the second or third aspect, the control unit calculates the pilot pressure based on an application current applied to the pressure increase electromagnetic valve or the pressure decrease electromagnetic valve.

The vehicle braking device according to a sixth aspect of the present invention, in the first aspect, further includes a high pressure source that stores a predetermined range of fluid pressure; and a low pressure source that stores a fluid pressure lower than the fluid pressure stored in the high pressure source. The valve unit has a pressure increase electromagnetic valve that adjusts flow rate of fluid inputted from the high pressure source into the pilot chamber, and a pressure decrease electromagnetic valve that adjusts flow rate of fluid outputted from the pilot chamber to the low pressure source. The control unit calculates the stroke-related value based on a feedback current applied to the pressure increase electromagnetic valve or the pressure decrease electromagnetic valve.

With the vehicle braking device according to a seventh aspect of the present invention, in the first aspect, the control unit calculates the stroke-related value based on a pressure gradient of the output pressure and consumption property of the brake fluid. According to the fourth to seventh aspects, a process of calculating the pilot pressure or the stroke-related value can be facilitated.

With the vehicle braking device according to an eighth aspect of the present invention, in any one of the first to seventh aspects, the control unit estimates a sliding resistance of the piston based on actual pressure of the output pressure, and estimates an amount of change in the output pressure based on the sliding resistance.

The amount of change in the output pressure can be calculated by summing the amount of change that depends on the stroke of the piston and the amount of change that depends on the sliding resistance at movement of the piston. In the fourth aspect, the amount of change in the output pressure is estimated based on the stroke-related value as well as the sliding resistance of the piston. This can estimate the amount of change more accurately, and can suppress overshoot or undershoot accurately.

With the vehicle braking device according to a ninth aspect of the present invention, in any one of the first to eighth aspects, the control unit sets a deadband with respect to a target pressure of the output pressure on the basis of the estimated amount of change in the output pressure.

When the actual output pressure falls within the range of the deadband, the control unit performs the holding control (control to set the amount of fluid inputted to and outputted from the pilot chamber to 0). In the fifth aspect, the deadband can be set based on the estimated amount of change in the output pressure, such that the actual pressure does not exceed (or fall below) the target pressure.

With the vehicle braking device according to a tenth aspect of the present invention, in any one of the first to eighth aspects, the control unit sets a pressure gradient of the output pressure required by the valve unit based on the estimated amount of change in the output pressure.

With this configuration, since the pressure gradient of the output pressure can be set based on the estimated amount of change in the output pressure, the pressure gradient can be set such that the actual pressure does not exceed (fall below) the target pressure.

DESCRIPTION OF EMBODIMENTS

A braking device in accordance with an embodiment of the present invention will be described below with reference to figures. In figures for description, shape and size of each component may not be necessarily precise.

First Embodiment

Figure 1:
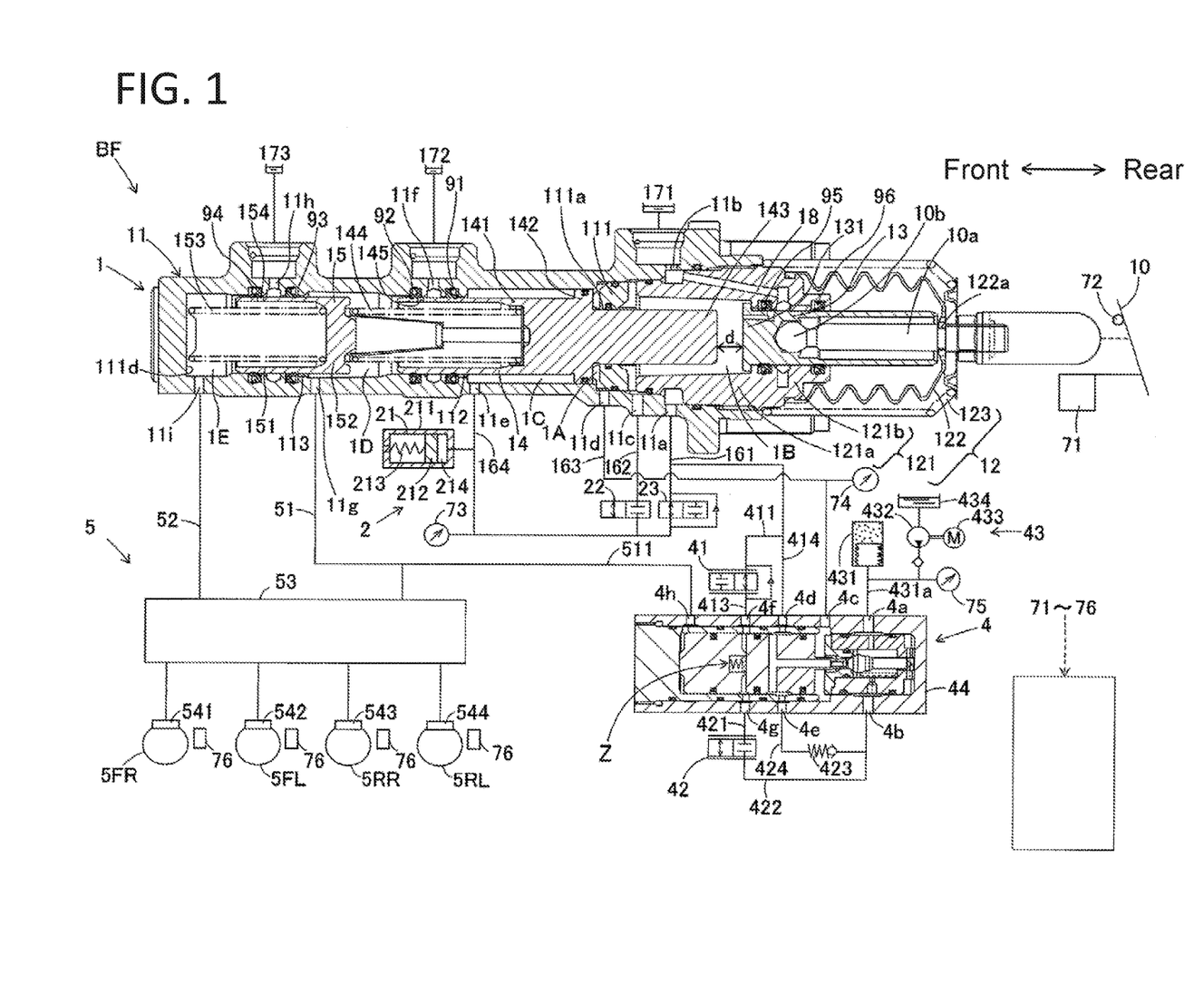
FIG. 1 is a configuration diagram illustrating configuration of a braking device in First embodiment.

As illustrated in FIG. 1, a braking device includes a fluid pressure braking force generator BF that generates a fluid pressure braking force in wheels 5FR, 5FL, 5RR, and 5RL, and a brake ECU (corresponding to "control unit") 6 that controls the fluid pressure braking force generator BF.

(Fluid Pressure Braking Force Generator BF)

The fluid pressure braking force generator BF includes a master cylinder 1, a reaction force generator 2, a first control valve 22, a second control valve 23, a servo pressure generator 4, a fluid pressure control unit 5, various sensors 71 to 76 and the like.

(Master Cylinder 1)

The master cylinder 1 serves to supply operating fluid to a fluid pressure control unit 5 according to an operating amount of the brake pedal 10, and includes a main cylinder 11, a cover cylinder 12, an input piston 13, a first master piston 14, a second master piston 15 and the like. The brake pedal 10 may be any braking operation means enabling the driver to perform a braking operation. The master piston may be one.

The main cylinder 11 is a substantially cylindrical closed-end housing that is closed at its front and opened at its rear. The main cylinder 11 is provided with an inner wall 111 inwardly protruding like a flange, in the rear of the inner circumference of the main cylinder 11. A through hole 111a penetrating in the forward and rearward direction is formed at the center of the inner wall 111. Further, a small-diameter portion 112 (rear) and a small-diameter portion 113 (front) that have a smaller diameter than the main cylinder 11 are provided in front of the inner wall 111. That is, the annular small-diameter portions 112, 113 protrude inward circularly from the inner circumferential face of the main cylinder 11. The first master piston 14 that is axially slidable on the small-diameter portion 112 is disposed in the main cylinder 11. Similarly, the second master piston 15 that is axially slidable on the small-diameter portion 113 is disposed in the main cylinder 11.

The cover cylinder 12 includes a substantially cylindrical cylinder portion 121, a bellows tube-like boot 122, and a cup-like compression spring 123. The cylinder portion 121 is disposed at the rear end of the main cylinder 11, and is coaxially fitted in a rear opening of the main cylinder 11. A front part 121a of the cylinder portion 121 has a larger inner diameter than the through hole 111a of the inner wall 111. Further, a rear part 121b of the cylinder portion 121 has a smaller inner diameter than the front part 121a.

The bellows tube-like dustproof boot 122 can contract and extend in the forward and rearward direction, and abut on an opening of the rear end of the cylinder portion 121 at the front side. A through hole 122a is formed at the center of main cylinder in the rear of the boot 122. The compression spring 123 is a coil-like biasing member disposed around the boot 122, and is contracted such that its front side abuts the rear end of the main cylinder 11, and its rear side comes close to the through hole 122a of the boot 122. The rear end of the boot 122 and the rear end of the compression spring 123 are connected to an operating rod 10a. The compression spring 123 biases the operating rod 10a rearward.

The input piston 13 slides in the cover cylinder 12 according to the operation of the brake pedal 10. The input piston 13 is a substantially cylindrical closed-end piston having a front bottom face and a rear opening. A bottom wall 131 forming the bottom face of the input piston 13 has a larger diameter than the other parts of the input piston 13. The input piston 13 is axially slidable in the rear part 121b of the cylinder portion 121 in a fluid-tight manner, and the bottom wall 131 is disposed on the inner circumferential side of the front part 121a of the cylinder portion 121.

The operating rod 10a linked to the brake pedal 10 is disposed in the input piston 13. A pivot 10b at the front end of the operating rod 10a can press the input piston 13 forward. The rear end of the operating rod 10a protrudes outward through the rear opening of the input piston 13 and the through hole 122a of the boot 122, and is connected to the brake pedal 10. When the brake pedal 10 is pressed, the operating rod 10a advances while axially pressing the boot 122 and the compression spring 123. With advancement of the operating rod 10a, the input piston 13 also advances in conjunction.

The first master piston 14 is disposed so as to be axially slidable along the inner wall 111 of the main cylinder 11. The first master piston 14 is unitarily formed of a pressing tubular portion 141, a flange portion 142, and a protrusion portion 143 in this order from the front. The pressing tubular portion 141 is a substantially cylindrical closed-end portion having a front opening, has a gap from the inner circumferential face of the main cylinder 11, and is slidingly contact with the small-diameter portion 112. A biasing member 144 that is a coil spring is disposed in an internal space of the pressing tubular portion 141 away from the second master piston 15. The biasing member 144 biases the first master piston 14 rearward. In other words, the first master piston 14 is biased toward a set initial position by the biasing member 144.

The flange portion 142 has a larger diameter than the pressing tubular portion 141, and is slidingly contact with the inner circumferential face of the main cylinder 11. The protrusion portion 143 has a smaller diameter than the flange portion 142, and is slidingly contact with the through hole 111a of the inner wall 111 in a fluid-tight manner. The rear end of the protrusion portion 143 protrudes into an internal space of the cylinder portion 121 through the through hole 111a, and is separated from the inner circumferential face of the cylinder portion 121. The rear end face of the protrusion portion 143 is separated from the bottom wall 131 of the input piston 13, and a distance d between them is variable.

A "first master chamber 1D" is defined by the inner circumferential face of the main cylinder 11, the front side of the pressing tubular portion 141 of the first master piston 14, and the rear side of the second master piston 15. Further, a rear chamber in the rear of the first master chamber 1D is defined by the inner circumferential face (inner circumferential portion) of the main cylinder 11, the small-diameter portion 112, the front surface of the inner wall 111, and the outer circumferential face of the first master piston 14. The front end and the rear end of the flange portion 142 of the first master piston 14 divide the rear chamber into a front part and a rear part, the front part defines a second fluid pressure chamber 1C, and the rear part defines a "servo chamber (corresponding to "output chamber") 1A". Further, a first fluid pressure chamber 1B is defined by the inner circumferential portion of the main cylinder 11, the rear face of the inner wall 111, the inner circumferential face (inner circumferential portion) of the front part 121a of the cylinder portion 121, the protrusion portion 143 (rear end) of the first master piston 14, and the front end of the input piston 12.

The second master piston 15 is disposed in front of the first master piston 14 in the main cylinder 11 so as to be axially slidable along the small-diameter portion 113. The second master piston 15 is unitarily formed of a tubular pressing tubular portion 151 having a front opening, and a bottom wall 152 that closes the rear side of the pressing tubular portion 151. The bottom wall 152 and the first master piston 14 support the biasing member 144. A coil spring-like biasing member 153 is disposed in an internal space of the pressing tubular portion 151 away from a closed inner bottom face 111d of the main cylinder 11. The biasing member 153 biases the second master piston 15 rearward. In other words, the second master piston 15 is biased toward a set initial position by the biasing member 153. A "second master chamber 1E" is defined by the inner circumferential face of the main cylinder 11, the inner bottom face 111d, and the second master piston 15.

The master cylinder 1 is provided with ports 11a to 11i that communicates the inside with the outside of the master cylinder 1. The port 11a is formed in the rear of the inner wall 111 in the main cylinder 11. The port 11b is formed at the same axial position as the port 11a as opposed to the port 11a. The port 11a communicates with the port 11b via an annular space between the inner circumferential face of the main cylinder 11 and the outer circumferential face of the cylinder portion 121. The port 11a and the port 11b are connected to a pipe 161 as well as a reservoir 171.

The port 11b communicates with the first fluid pressure chamber 1B via a passage 18 formed in the cylinder portion 121 and the input piston 13. When the input piston 13 advances, the passage 18 is blocked, disconnecting the first fluid pressure chamber 1B from the reservoir 171.

The port 11c is formed in the rear of the inner wall 111 and in front of the port 11a, and communicates the first fluid pressure chamber 1B with a pipe 162. The port 11d is formed in front of the port 11c, and communicates the servo chamber 1A with a pipe 163. The port 11e is formed in front of the port 11d, and communicates the second fluid pressure chamber 1C with a pipe 164.

A port 11f is formed between the sealing members 91 and 92 of the small-diameter portion 112, and communicates a reservoir 172 with the inside of the main cylinder 11. The port 11*f* communicates with the first master chamber 1D via a passage 145 formed in the first master piston 14. The passage 145 is formed at a position where the port 11*f* is disconnected from the first master chamber 1D when the first master piston 14 advances. A port 11*g* is formed in front of the port 11*f*, and communicates the first master chamber 1D with a pipe 51.

A port 11*h* is formed between the sealing members 93 and 94 of the small-diameter portion 113, and communicates a reservoir 173 with the inside of the main cylinder 11. The port 11*h* communicates with the second master chamber 1E via a passage 154 formed in a pressing tubular portion 151 of the second master piston 15. The passage 154 is formed at a position where the port 11*h* is disconnected from the second master chamber 1E when the second master piston 15 advances. A port 11*i* is formed in front of the port 11*h*, and communicates the second master chamber 1E with a pipe 52.

Sealing members such as O-rings (black circles in this figure) are disposed in the master cylinder 1 as appropriate. The sealing members 91, 92 are disposed on the small-diameter portion 112, and abut the outer circumferential face of the first master piston 14 in a fluid-tight manner. Similarly, the sealing members 93, 94 are disposed on the small-diameter portion 113, and abut the outer circumferential face of the second master piston 15 in a fluid-tight manner. Further, sealing members 95, 96 are disposed between the input piston 13 and the cylinder portion 121.

A stroke sensor 71 detects the operating amount (stroke amount) of the brake pedal 10 by the driver, and transmits a detection signal to the brake ECU 6. A brake stop switch 72 detects whether the driver operates the brake pedal 10 using a binary signal, and transmits a detection signal to the brake ECU 6.

(Reaction Force Generator 2)

The reaction force generator 2 serves to generate a reaction force that counteracts an operating force of the brake pedal 10, and is configured of mainly a stroke simulator 21. The stroke simulator 21 generates a reaction force fluid pressure in the first fluid pressure chamber 1B and the second fluid pressure chamber 1C in response to the operation of the brake pedal 10. The stroke simulator 21 is configured by slidably fitting a piston 212 into a cylinder 211. The piston 212 is biased forward by a compression spring 213, and a reaction force fluid pressure chamber 214 is formed on the side of the front surface of the piston 212. The reaction force fluid pressure chamber 214 is connected to the second fluid pressure chamber 1C via the pipe 164 and the port 11*e*, and is connected to the first control valve 22 and the second control valve 23 via the pipe 164.

(First Control Valve 22)

The first control valve 22 is an electromagnetic valve that is closed in the nonconducting state, and is opened/closed under control of the brake ECU 6. The first control valve 22 is connected between the pipe 164 and the pipe 162. Here, the pipe 164 communicates with the second fluid pressure chamber 1C via the port 11*e*, and the pipe 162 communicates with the first fluid pressure chamber 1B via the port 11*c*. When the first control valve 22 opens, the first fluid pressure chamber 1B is opened, and when the first control valve 22 closes, the first fluid pressure chamber 1B is closed tightly. Thus, the pipe 164 and the pipe 162 are provided to communicate the first fluid pressure chamber 1B with the second fluid pressure chamber 1C.

The first control valve 22 closes in the nonconducting state to disconnect the first fluid pressure chamber 1B from the second fluid pressure chamber 1C. Accordingly, the first fluid pressure chamber 1B is closed tightly and thus, the operating fluid has nowhere to go, and the input piston 13 and the first master piston 14 work together while keeping a constant distance d therebetween. The first control valve 22 is opened in the conducting state to communicate the first fluid pressure chamber 1B with the second fluid pressure chamber 1C. As a result, a change in the volume of the first fluid pressure chamber 1B and the second fluid pressure chamber 1C due to advance/retreat of the first master piston 14 is absorbed by movement of the operating fluid.

A pressure sensor 73 serves to detect the reaction force fluid pressure in the second fluid pressure chamber 1C and the first fluid pressure chamber 1B, and is connected to the pipe 164. The pressure sensor 73 detects the pressure in the second fluid pressure chamber 1C when the first control valve 22 is in the opened state, and also detects the pressure in the first fluid pressure chamber 1B when the first control valve 22 is in the opened state. The pressure sensor 73 transmits a detection signal to the brake ECU 6.

(Second Control Valve 23)

The second control valve 23 is an electromagnetic valve that opens in the nonconducting state, and is opened/closed under control of the brake ECU 6. The second control valve 23 is connected between the pipe 164 and the pipe 161. Here, the pipe 164 communicates with the second fluid pressure chamber 1C via the port 11*e*, and the pipe 161 communicates with the reservoir 171 via the port 11*a*. Accordingly, the second control valve 23 communicates the second fluid pressure chamber 1C with the reservoir 171 in the nonconducting state, generating no reaction force fluid pressure, and disconnects the second fluid pressure chamber 1C from the reservoir 171 in the conducting state, generating the reaction force fluid pressure.

(Servo Pressure Generator 4)

The servo pressure generator 4 includes a pressure decrease valve (corresponding to "pressure decrease electromagnetic valve") 41, a pressure increase valve (corresponding to "pressure increase electromagnetic valve") 42, a pressure supply portion 43, a regulator 44 and the like. The pressure decrease valve 41 is an electromagnetic valve that opens in a nonconducting state, and its flow rate is controlled by the brake ECU 6. One side of the pressure decrease valve 41 is connected to a pipe 161 via a pipe 411, and the other side of the pressure decrease valve 41 is connected to a pipe 413. That is, one side of the pressure decrease valve 41 communicates with a reservoir (corresponding to "low pressure source") 171 via the pipes 411, 161 and ports 11*a*, 11*b*. The pipe 411 may be connected to a below-mentioned reservoir 434 rather than the reservoir 171. In this case, the reservoir 434 corresponds to a low pressure source. The reservoir 171 may be the same as the reservoir 434.

The pressure increase valve 42 is an electromagnetic valve that closes in the nonconducting state, and its flow rate is controlled by the brake ECU 6. One side of the pressure increase valve 42 is connected to a pipe 421, and the other side of the pressure increase valve 42 is connected to a pipe 422. The pressure decrease valve 41 and the pressure increase valve 42 corresponds to a pilot fluid pressure generator.

The pressure feed portion 43 is a portion that mainly feeds the high-pressure operating fluid to the regulator 44. The pressure feed portion 43 includes an accumulator 431 (corresponding to "high pressure source"), a fluid pressure pump 432, a motor 433, a reservoir 434 and the like.

The accumulator 431 is a tank that stores the high-pressure operating fluid. The accumulator 431 is connected to the regulator 44 and the fluid pressure pump 432 via the pipe 431a. The fluid pressure pump 432 is driven by the motor 433, and pressure-feeds the operating fluid stored in the reservoir 434 to the accumulator 431. A pressure sensor 75 provided on the pipe 431a detects the accumulator fluid pressure of the accumulator 431, and sends the detected signal to the brake ECU 6. The accumulator fluid pressure corresponds to the amount of the operating fluid stored in the accumulator 431.

When the pressure sensor 75 detects that the accumulator fluid pressure lowers to a predetermined value or less, the motor 433 is driven according to an instruction from the brake ECU 6. Thereby, the fluid pressure pump 432 pressure-feeds the operating fluid to the accumulator 431, and returns the accumulator fluid pressure to a predetermined value or more.

Figure 2:
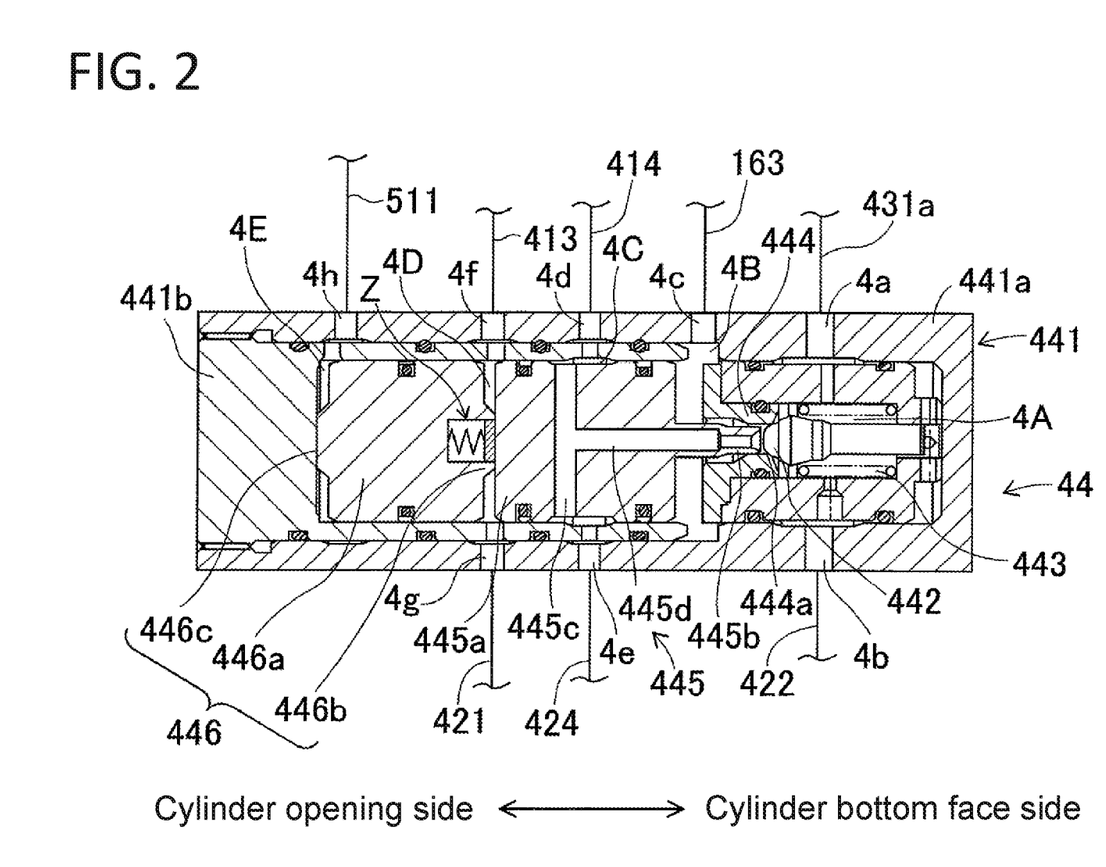
FIG. 2 is a sectional view illustrating detailed configuration of a regulator in First embodiment.

As illustrated in FIG. 2, a regulator (corresponding to "pressure adjustment unit") 44 includes a cylinder 441, a ball valve 442, a bias unit 443, a valve seat 444, a control piston (corresponding to "piston") 445, a sub piston 446 and the like.

The cylinder 441 includes a substantially cylindrical closed-end cylinder case 441a having a bottom face on one side (right side in the figure) and a cover member 441b that closes an opening (left side in the figure) of the cylinder case 441a. The cylinder case 441a is provided with a plurality of ports 4a to 4h that communicate the inside with the outside of the cylinder case. The cover member 441b is a substantially cylindrical closed-end body, and has ports opposed to the plurality of ports 4a to 4h of the cylinder case.

The port 4a is connected to a pipe 431a. The port 4b is connected to the pipe 422. The output port 4c is connected to the pipe 163. The pipe 163 connects the servo chamber 1A to the output port 4c. The port 4d is connected to the pipe 161 via a pipe 414. The port 4e is connected to a pipe 424, and is connected to the pipe 422 via a relief valve 423. The port 4f is connected to the pipe 413. The port 4g is connected to the pipe 421. The port 4h is connected to a pipe 511 branching from the pipe 51. The pipe 414 may be connected to the reservoir 434 rather than the pipe 161.

The ball valve 442 is a ball-shaped valve, and is disposed on the side of the bottom face of the cylinder case 441a in the cylinder 441 (also referred to as cylinder bottom face side). The biasing portion 443 is a spring member that biases the ball valve 442 toward the side of an opening of the cylinder case 441a (also referred to as cylinder opening side), and is provided on the bottom face of the cylinder case 441a. The valve seat 444 is a wall member provided on the inner circumferential face of the cylinder case 441a, and divides the cylinder opening side from the cylinder bottom face side. A penetration passage 444a that communicates the cylinder opening side with the cylinder bottom face side is formed at the center of the valve seat 444. The valve seat 444 holds the ball valve 442 from the cylinder opening side such that the biased ball valve 442 closes the penetration passage 444a. A valve seat face 444b, on which the ball valve 442 is removably seated (contact), is formed in an opening of the penetration passage 444a on the cylinder bottom face side.

A space defined by the ball valve 442, the biasing portion 443, the valve seat 444, and the inner circumferential face of the cylinder case 441a of the cylinder bottom face side is defined as a "first chamber 4A". The first chamber 4A is filled with the operating fluid, is connected to the pipe 431a via the port 4a, and is connected to the pipe 422 via the port 4b.

The control piston 445 includes a substantially cylindrical body portion 445a and a substantially cylindrical protruding portion 445b having a smaller diameter than the body portion 445a. The body portion 445a is coaxially and fluid-tightly disposed in the cylinder 441 on the cylinder opening side of the valve seat 444 so as to be axially slidable. The body portion 445a is biased toward the cylinder opening side by a biasing member not shown. A passage 445c that is opened on the circumference face of the body portion 445a at both ends and radially (vertically in this figure) extends is formed substantially at the axial center of the body portion 445a. The inner circumferential face of the part of the cylinder 441, which corresponds to the openings of the passage 445c, has the port 4d, and is dented. The dented is defined as a "third chamber 4C".

The protruding portion 445b protrudes toward the cylinder bottom face side from the center of the end face of the body portion 445a on the cylinder bottom face side. The protruding portion 445b has a smaller diameter than the penetration passage 444a of the valve seat 444. The protruding portion 445b and the penetration passage 444a are coaxially disposed. A front end of the protruding portion 445b is separated from the ball valve 442 by a predetermined distance on the cylinder opening side. The protruding portion 445b is provided with a passage 445d that is opened at the center of the end face of the protruding portion 445b on the cylinder bottom face side and axially extends. The passage 445d extends into the body portion 445a, and is connected to the passage 445c.

A space delimited by the end face of the body portion 445a on the cylinder bottom face side, the outer circumferential face of the protruding portion 445b, the inner circumferential face of the cylinder 441, the valve seat 444, and the ball valve 442 is defined as a "second chamber 4B". The second chamber 4B communicates with ports 4d, 4e via passages 445d, 445c and a third chamber 4C in the state where the protruding portion 445b is not contact with the ball valve 442.

The sub piston 446 includes a sub body portion 446a, a first protruding portion 446b, and a second protruding portion 446c. The sub body portion 446a is substantially cylindrical. The sub body portion 446a is coaxially and fluid-tightly disposed in the cylinder 441 on the cylinder opening side of the body portion 445a so as to be axially slidable.

The first protruding portion 446b is substantially cylindrical, has a smaller diameter than the sub body portion 446a, and protrudes at the center of the end face of the sub body portion 446a on the cylinder bottom face side. The first protruding portion 446b abuts the end face of the body portion 445a on the cylinder opening side. The second protruding portion 446c has the same shape as the first protruding portion 446b, and protrudes at the center of the end face of the sub body portion 446a on the cylinder opening side. The second protruding portion 446c abuts the cover member 441b.

A space delimited by the end face of the sub main portion 446a on the cylinder bottom face side, the outer circumferential face of the first protruding portion 446b, the end face of the control piston 445 on the cylinder opening side, and the inner circumferential face of the cylinder 441 is defined as a "first pilot chamber (corresponding to "pilot chamber") 4D". The first pilot chamber 4D communicates with the pressure decrease valve 41 via a port 4f and the pipe 413, and communicates with the pressure increase valve 42 via a port 4g and the pipe 421.

A space delimited by the end face of the sub main portion 446a on the cylinder opening side, the outer circumferential face of the second protruding portion 446c, the cover member 441b, and the inner circumferential face of the cylinder 441 is defined as a "second pilot chamber 4E". The second pilot chamber 4E communicates with the port 11g via a port 4h and the pipes 511, 51. The chambers 4A to 4E each are filled with the operating fluid. The pressure sensor 74 detects the servo pressure (corresponding to "output pressure") supplied to the servo chamber 1A, and is connected to the pipe 163. The pressure sensor 74 transmits a detection signal to the brake ECU 6.

The regulator 44 has the control piston 445 driven by a difference between a force corresponding the pressure in the first pilot chamber 4D (also referred to as "pilot pressure") and a force corresponding to the servo pressure (output pressure). For example, the capacity of the first pilot chamber 4D changes with movement of the control piston 445. As the difference between the forces increases by the change of the volume of the first pilot chamber 4D with the movement of the control piston 445, the movement of the control piston 445 with respect to the position of the control piston 445 in the state where the force corresponding to the pilot pressure matches with the force corresponding to the servo pressure, increasing the flow rate of fluid inputted to and outputted from the servo chamber 1A.

The regulator 44 is configured such that as the flow rate of fluid inputted from the accumulator 431 to the first pilot chamber 4D increases, the first pilot chamber 4D extends to increase the flow rate of fluid inputted to the servo chamber 1A from the accumulator 431, and as the flow rate of fluid outputted from the first pilot chamber 4D to the reservoir 171 increases, the first pilot chamber 4D contracts to increase the flow rate of fluid outputted from the servo chamber 1A to the reservoir 171.

The control piston 445 includes a damper device Z on a wall that faces the first pilot chamber 4D. The damper device Z is configured as a stroke simulator, and has a piston part biased toward the first pilot chamber 4D by a biasing member. The damper device Z enables the stiffness of the first pilot chamber 4D to be set according to the pilot pressure.

(Fluid Pressure Control Unit 5)

Wheel cylinders 541 to 544 communicate with the first master chamber 1D and the second master chamber 1E that generate the master cylinder fluid pressure (master pressure) via the pipes 51, 52, and an ABS (Antilock Brake System) 53. The wheel cylinders 541 to 544 configure brakes for the wheels 5FR to 5RL. Specifically, the well-known ABS 53 is coupled to the port 11g of the first master chamber 1D and the port 11i of the second master chamber 1E via the pipe 51 and the pipe 52, respectively. The wheel cylinders 541 to 544 that activate the brake for braking the wheels 5FR to 5RL are coupled to the ABS 53.

The ABS 53 includes a wheel speed sensor 76 that detects wheel speed. A detection signal indicating the wheel speed detected by the wheel speed sensor 76 is outputted to the brake ECU 6.

In the ABS 53 thus configured, the brake ECU 6 switches each of the holding valves and the pressure decrease valve according to the master pressure, the wheel speed, and longitudinal acceleration, and activates the motor as necessary to adjust the brake fluid pressure applied to the wheel cylinders 541 to 544, that is, the braking force applied to the wheels 5FR to 5RL, thereby performing ABS control (antilock brake control). The ABS 53 is a device which adjusts the amount and timing of the operating fluid supplied from the master cylinder 1 according to an instruction of the brake ECU 6, and supplies the adjusted brake fluid to the wheel cylinders 541 to 544.

In the below-mentioned "brake control", the fluid pressure sent from the accumulator 431 of the servo pressure generator 4 is controlled by the pressure increase valve 42 and the pressure decrease valve 41, generating the "servo pressure" in the servo chamber 1A. Then, the first master piston 14 and the second master piston 15 advance to pressurize the first master chamber 1D and the second master chamber 1E. The fluid pressure in the first master chamber 1D and the second master chamber 1E is supplied as the master pressure from the ports 11g, 11i to the wheel cylinders 541 to 544 via the pipes 51, 52 and the fluid pressure controller 53 and thus, a fluid pressure braking force is applied to the wheels 5FR to 5RL.

(Brake ECU 6)

The brake ECU 6 is an electronic control unit, and has a microcomputer. The microcomputer includes an input/output interface, and a storage unit such as CPU, RAM, ROM, or nonvolatile memory, which are interconnected via a bus.

To control the electromagnetic valves 22, 23, 41, and 42, the motor 433 and the like, the brake ECU 6 is connected to the various sensors 71 to 76. The brake ECU 6 receives the operating amount (stroke amount) of the brake pedal 10 by the driver from the stroke sensor 71, receives presence/absence of the operation of the brake pedal 10 by the driver from the brake stop switch 72, receives the reaction force fluid pressure in the second fluid pressure chamber 1C or the pressure in the first fluid pressure chamber 1B (or the reaction force fluid pressure) from the pressure sensor 73, receives the servo pressure supplied to the servo chamber 1A from the pressure sensor 74, receives the accumulator fluid pressure of the accumulator 431 from the pressure sensor 75, and receives the speed of the wheels 5FR, 5FL, 5RR, and 5RL from the wheel speed sensor 76.

(Brake Control)

Brake control of the brake ECU 6 will be described below. The brake control is normal brake control. That is, it is given that the brake ECU 6 energizes and opens the first control valve 22, and energizes and closes the second control valve 23. The second control valve 23 is closed to disconnect the second fluid pressure chamber 1C from the reservoir 171, and the first control valve 22 is opened to communicate the first fluid pressure chamber 1B with the second fluid pressure chamber 1C. As described above, brake control controls the pressure decrease valve 41 and the pressure increase valve 42 in the state where the first control valve 22 is opened and the second control valve 23 is closed to control the servo pressure in the servo chamber 1A. The pressure decrease valve 41 and the pressure increase valve 42 may be called a valve unit for adjusting the flow rate of the operating fluid inputted to and outputted from the first pilot chamber 4D. In the brake control, the brake ECU 6 calculates a "demand braking power" required by the driver on the basis of the operating amount (movement of the input piston 13) of the brake pedal 10, which is detected by the stroke sensor 72, or the operating force of brake pedal 10.

Describing in detail, in the state where the brake pedal 10 is not pressed, the above-mentioned state occurs, that is, the ball valve 442 closes a through passage 444a of the valve seat 444. The pressure decrease valve 41 is opened, and the pressure increase valve 42 is closed. That is, the first chamber 4A is separated from the second chamber 4B.

The second chamber 4B communicates with the servo chamber 1A via the pipe 163, and these chambers are kept at the same pressure. The second chamber 4B communicates with the third chamber 4C via the passages 445c, 445d of the control piston 445. Therefore, the second chamber 4B and the third chamber 4C communicates with the reservoir 171 via the pipes 414, 161. One side of the first pilot chamber 4D is closed by the pressure increase valve 42, and the other side of the first pilot chamber 4D communicates with the reservoir 171 via the pressure decrease valve 41. The first pilot chamber 4D and the second chamber 4B are kept at the same pressure. The second pilot chamber 4E communicates with the first master chamber 1D via the pipes 511 and 51, and both of them are kept at the same pressure.

When the brake pedal 10 is pressed from this state, the brake ECU 6 controls the pressure decrease valve 41 and the pressure increase valve 42 based on the target friction braking power. That is, the brake ECU 6 performs control to close the pressure decrease valve 41 and open the pressure increase valve 42.

The pressure increase valve 42 is opened to communicate the accumulator 431 with the first pilot chamber 4D. The pressure decrease valve 41 is closed to disconnect the first pilot chamber 4D from the reservoir 171. The high-pressure operating fluid supplied from the accumulator 431 can increase the pressure in the first pilot chamber 4D. The increase in the pressure in the first pilot chamber 4D causes the control piston 445 to slide along the cylinder bottom face side. Then, the front end of the protruding portion 445b of the control piston 445 contacts the ball valve 442 to close the passage 445d with the ball valve 442. This disconnects the second chamber 4B from the reservoir 171.

Further, the control piston 445 slides along the cylinder bottom face side, allowing the protruding portion 445b to press the ball valve 442 to the cylinder bottom face side, separating the ball valve 442 from the valve seat 444b. Thereby, the first chamber 4A communicates with the second chamber 4B via the through passage 444a of the valve seat 444. The first chamber 4A receives high-pressure operating fluid from the accumulator 431, and the pressure in the second chamber 4B rises due to the communication of the second chamber 4B with the first chamber 4A. As the distance between the ball valve 442 and the valve seat 444b increases, the passage for the operating fluid becomes larger to increase the flow rate from the first chamber 4A to the second chamber 4B. That is, as the pressure in the first pilot chamber 4D (pilot pressure) increases, the movement distance of the control piston 445 increases to increase the distance between the ball valve 442 and the valve seat 444b to rise the fluid pressure (servo pressure) of the second chamber 4B. The brake ECU 6 controls the pressure increase valve 42 such that the pilot pressure in the first pilot chamber 4D becomes higher as the movement amount (operating amount of the brake pedal 10) of the input piston 13 detected by the stroke sensor 72 increases. That is, as movement amount (operating amount of the brake pedal 10) of the input piston 13 increases, the pilot pressure increases, and the servo pressure also increases.

With an increase in the pressure in the second chamber 4B, the pressure in the servo chamber 1A communicating with the second chamber 4B increases. With an increase in the servo chamber 1A, the first master piston 14 advances, and the pressure in the first master chamber 1D increases. Then, the second master piston 15 also advances, and the pressure in the second master chamber 1E rises. With a pressure increase in the first master chamber 1D, high-pressure operating fluid is supplied to a below-mentioned ABS 53 and the second pilot chamber 4E. Although the pressure in the second pilot chamber 4E increases, the pressure in the first pilot chamber 4D similarly increases and thus, the sub piston 446 does not travel. As described above, high-pressure (master pressure) operating fluid is supplied to the ABS 53, causing a frictional brake to brake the vehicle. The force to advance the first master piston 14 in the "brake control" corresponds to the servo pressure.

To release the braking operation, conversely, the pressure decrease valve 41 is opened and the pressure increase valve 42 is closed to communicate the reservoir 171 with the first pilot chamber 4D. Thereby, the control piston 445 retreats and returns to the state where the brake pedal 10 is not pressed.

(Control to Suppress Overshoot and Undershoot)

In the brake control, the brake ECU 6 performs control to suppress overshoot and undershoot (hereinafter referred to as "suppression control"). In the suppression control, the brake ECU 6 estimates the amount of change in the servo pressure even after switching from the pressure increase control or the pressure decrease control of the servo pressure to the holding control on the basis of the stroke-related value (hereinafter referred to as "hysteresis amount"), and controls the pressure decrease valve 41 and the pressure increase valve 42 on the basis of the estimated hysteresis amount.

For example, the pressure increase control, that is, the state where the control piston 445 presses the ball valve 442 to communicate the first chamber 4A with the second chamber 4B (the control piston 445 is located at the pressure increase position) is switched to the holding control, that is, the state where the pressure decrease valve 41 and the pressure increase valve 42 are closed to seal the first pilot chamber 4D, the pressure increase state continues until the control piston 445 retreats from the pressure increase position to disconnect the first chamber 4A from the second chamber 4B. Thereby, the hysteresis amount is generated. That is, the hysteresis amount depends on at least the stroke amount of the control piston 445.

The stroke-related value includes the servo pressure, the pilot pressure, the accumulator pressure, and the stiffness of the first pilot chamber 4D. In this embodiment, the first protruding portion 446b is provided with the damper device Z such as a stroke simulator 21, extending or contracting according to the pilot pressure to change the capacity of the first pilot chamber irrespective of the movement of the control piston 445. The property of the stiffness with respect to the pilot pressure is stored as data in the brake ECU 6.

The hysteresis amount can be estimated based on the stroke-related value. Specifically, the hysteresis amount may be estimated as a sum of an amount that depends on the sliding resistance of the control piston 445 (hereinafter referred to as "resistance-dependent term") and an amount that depends on the stroke amount of the control piston 445 and the stiffness of the first pilot chamber 4D (hereinafter referred to as "stroke-dependent term"). The resistance-dependent term is a value of the sliding resistance at the time when the control piston 445 moves at switching to the holding control, and can be found by multiplying the servo pressure by a factor $\alpha$ (sliding resistance=servo pressure$\times\alpha$).

The stroke-dependent term can be estimated by $G \times K \times \{(P_p - P_s)/(P_a - P_s)^{1/2}\}$. The expression is referred to as a stroke-dependent term estimation expression. G denotes the stiffness of the first pilot chamber 4D (spring constant of the damper device Z). K denotes proportionality constant. $P_p$ denotes pilot pressure. $P_s$ denotes servo pressure, and can be measured by the pressure sensor 74. $P_a$ denotes accumulator pressure, and can be measured by the pressure sensor 75. $P_p$ can be estimated by correlation between the servo pressure and the pilot pressure. For example, $P_p$ can be estimated as multiplying the servo pressure by hydraulic ratio (pressure ratio). The part of the stroke-dependent term estimation expression except for G corresponds to the stroke amount of the control piston 445. In this case, the brake ECU 6 calculates the stroke-related value using the relational expression that is proportional to a difference between the pilot pressure Pp and the servo pressure Ps, and is inversely proportional to a difference between the accumulator pressure Pa and the servo pressure Ps.

The brake ECU 6 finds the resistance-dependent term based on the servo pressure, and the stroke-dependent term based on the stroke-related value, and finds the hysteresis amount using the both terms. Then, the brake ECU 6 finds the hysteresis amount every predetermined time (or at all times), and stores a maximum value each time the maximum value is calculated in one pressure increase control or pressure decrease control. The maximum value is reset when one pressure increase control or pressure decrease control is finished (the pressure increase control or the pressure decrease control is switched to the holding control), and then, next pressure increase control or pressure decrease control starts. This is due to that, at switching to the holding control, the position of the control piston 445 returns to the holding position, and the stroke amount is reset. The brake ECU 6 sets a deadband with respect to the target pressure of the servo pressure based on the maximum value of the hysteresis amount. The target pressure is a target pressure according to the operation of the brake pedal 10, and is stored as a map in the brake ECU 6.

The deadband is set on a plus side and a minus side of the target pressure. When the actual servo pressure falls within the range of the deadband, the brake ECU 6 switches the brake control to the holding control. In the holding control, the pressure decrease valve 41 and the pressure increase valve 42 are closed. That is, in controlling the fluid pressure, when the actual pressure falls within the range of the deadband (deadband region), the brake ECU 6 recognizes the actual pressure substantially reaches the target pressure. By setting the deadband, hunting of the fluid pressure control can be further suppressed as compared to the case where the target pressure is set to be s single point.

In this embodiment, the brake ECU 6 sets a width of the deadband based on the maximum value of the hysteresis amount. In the case where a half width of the deadband is set to the hysteresis amount, when the actual pressure falls within the deadband, that is, the difference between the target value and the actual pressure is the maximum value of the hysteresis amount, control is switched to the holding control. Thus, after switching to the holding control, the servo pressure changes depending on the stroke and the like of the control piston 445. However, overshoot (or undershoot) caused by the change is suppressed.

Figure 3:
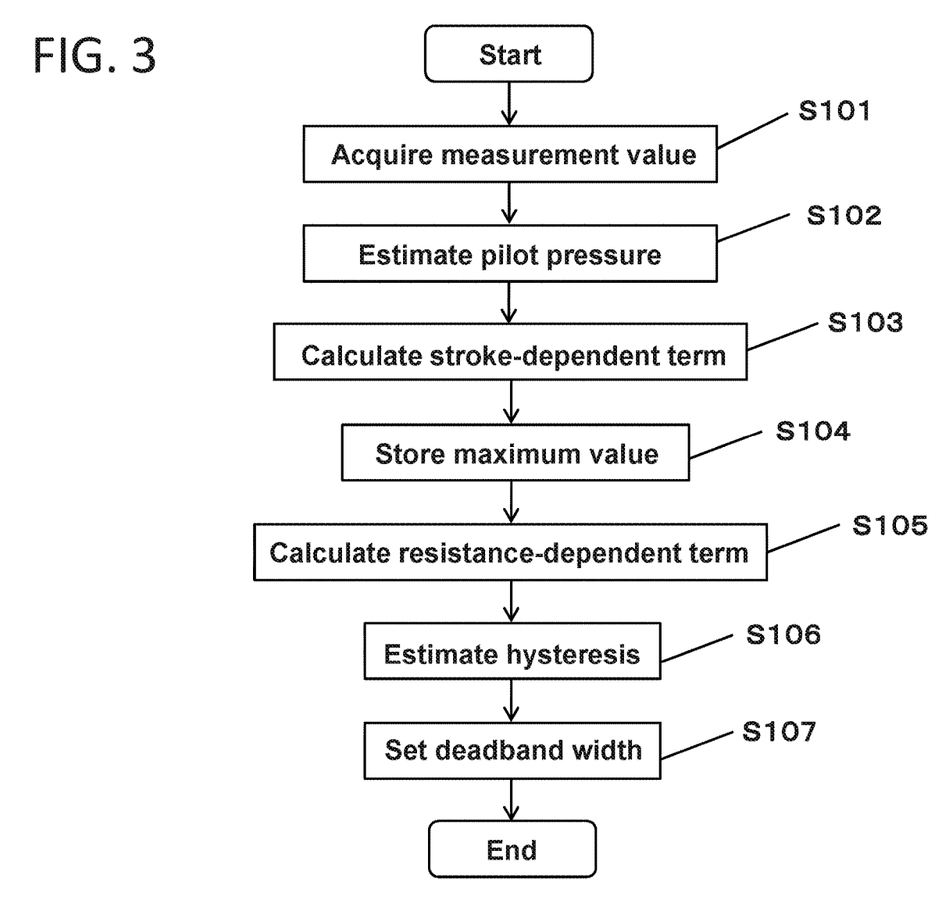
FIG. 3 is a flow chart illustrating suppression control of a servo pressure in First embodiment.

The flow of control in this embodiment will be described below. As illustrated in FIG. 3, the brake ECU 6 acquires the servo pressure from the pressure sensor 74, and the accumulator pressure from the pressure sensor 75 (S101). The brake ECU 6 estimates the pilot pressure from the stored correlation on the basis of the acquired servo pressure (S102). The brake ECU 6 substitutes the acquired servo pressure Ps, the accumulator pressure Pa, the estimated pilot pressure Pp, and the stiffness G corresponding to "the estimated pilot pressure Pp" based on the stiffness property of the first pilot chamber 4D into the stroke-dependent term estimation expression to calculate the stroke-dependent term (S103).

Subsequently, the brake ECU 6 determines whether or not the calculated stroke-dependent term exceeds the stored past maximum value, and stores the calculated stroke-dependent item when the calculated stroke-dependent term exceeds the stored maximum value, and stores the past maximum value as it is when the calculated stroke-dependent term does not exceed the stored maximum value (S104). The brake ECU 6 starts to store the maximum value when the pressure increase control or the pressure decrease control starts, and resets the maximum value when control is switched to the holding control, and next pressure increase control or pressure decrease control starts.

The brake ECU 6 calculates the resistance-dependent term in addition to the stroke-dependent term (S105). In this embodiment, the brake ECU 6 multiplies the acquired servo pressure by a factor related to the sliding resistance, and calculates the resistance-dependent term caused by the sliding resistance of the control piston 445. The brake ECU 6 estimates a sum of the stroke-dependent term (maximum value) and the resistance-dependent term as the hysteresis amount (S106). Based on the estimated hysteresis amount, the brake ECU 6 sets the width of the deadband with respect to the target pressure of the servo pressure (S107). Specifically, the brake ECU 6 sets the deadband such that the half width of the deadband (difference between the target pressure and a minimum value or maximum value of the deadband) becomes the hysteresis amount. The deadband at a current time t2 is set based on the stroke-related value measured at a previous time t1 or before by feedback (t1<t2). In this case, the brake ECU 6 may be set to multiply the hysteresis amount estimated in S106 by a safety factor (safety factor <1) according to a pressure increase width or a pressure decrease width per unit time. In this case, when the pressure increase width or the pressure decrease width is smaller than a predetermined value, the brake ECU 6 multiply the estimated hysteresis amount by the safety factor. The brake ECU 6 performs the suppression control (S101 to S107) every predetermined time (at all times). That is, the deadband is set every predetermined time (at all times).

Figure 4:
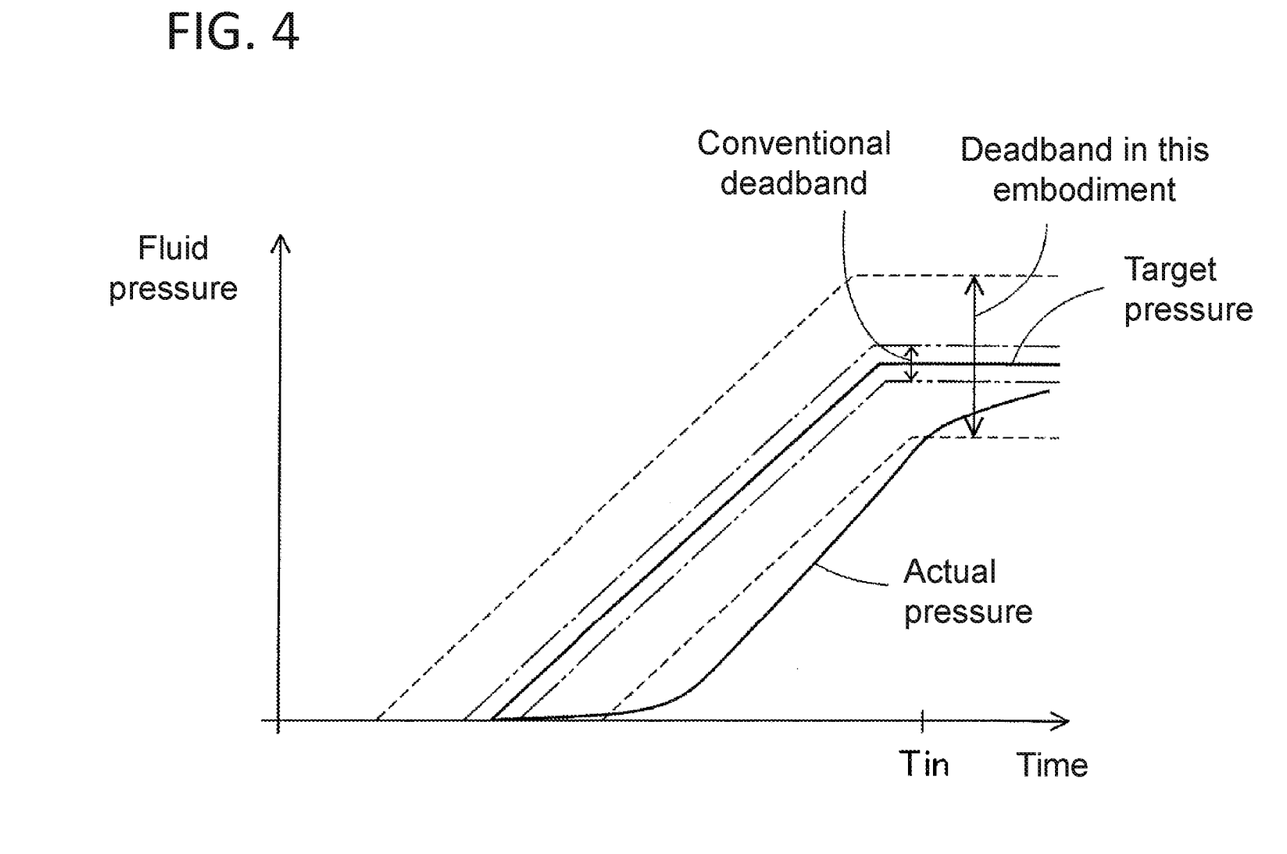
FIG. 4 is a view for describing suppression control in pressure increase control in First embodiment.

As illustrated in FIG. 4, when the braking operation starts in the pressure increase control, at an initial stage of pressing of the brake pedal 10, the pressure gradient of pressure increase increases, and the estimated hysteresis amount also increases. Then, the deadband width is set based on the hysteresis amount, and is maintained until the maximum value is updated. Subsequently, the pressure increase control is switched to the holding control, and the deadband width is kept at the maximum value. Next, when the holding control is switched to the pressure decrease control or the pressure increase control, the maximum value is reset. A new deadband is set based on the maximum value of the hysteresis amount estimated at this time. Chain double-dashed line in FIG. 4 illustrates a conventionally set deadband. In this embodiment, a timing Tin at which the actual servo pressure falls within the deadband becomes earlier than conventional, and due to occurrence of hysteresis, the actual pressure is held at the target pressure or a value close to the target pressure. Since the deadband is set based on the estimated hysteresis amount, overshoot can be suppressed.

In this embodiment, in the pressure increase control or the pressure decrease control, the brake ECU 6 estimates the hysteresis amount, and sets the deadband according to the maximum value of the hysteresis amount. The hysteresis amount is the amount of change in the servo pressure that changes when control is switched to the holding control. Accordingly, when the half width of the deadband is set to the hysteresis amount, even hysteresis occurs after the actual servo pressure falls within the deadband, and control is switched to the holding control, the difference between the target pressure and the actual pressure at the switching corresponds to the hysteresis amount, suppressing the servo pressure from exceeding the target pressure. That is, in this embodiment, overshoot and undershoot can be suppressed.

Second Embodiment

The vehicle braking device in second embodiment is different from the vehicle braking device in First embodiment in a method of estimating the pilot pressure in the suppression control. Thus, the difference will be described below. The brake ECU 6 estimates the pilot pressure (corresponding to S102 in First embodiment) based on the application current applied to the pressure increase valve 42 during pressure increase, and estimates the pilot pressure based on the application current applied to the pressure decrease valve 41 during pressure decrease.

Specifically, the application current is a sum of a valve opening current (minimum current that opens a valve) and a feedback current (current determined by mapping or calculation based on the difference between the actual pressure and the target pressure: FB current). The valve opening current is a current determined based on the difference between the pilot pressure and the accumulator pressure (during pressure increase) or the atmospheric pressure (during pressure decrease). The brake ECU 6 determines the valve opening current from the actually measured values (values of the pressure sensors 74, 74) based on relationship between "the difference between the actual servo pressure (that can be converted into the pilot pressure) and the accumulator pressure or the atmospheric pressure" and "the valve opening current", which is previously set by experiment or calculation.

In S102 in First embodiment, the brake ECU 6 estimates the pilot pressure from the application current of the pressure increase valve 42 during pressure increase, and the application current of the pressure decrease valve 41 during pressure decrease. This configuration achieves the same effect as in First embodiment.

Third Embodiment

A vehicle control unit in Third embodiment is different from the vehicle control unit in the above-mentioned embodiment in which the pressure gradient of the servo pressure is set (corrected) based on the hysteresis amount rather than setting (correcting) the deadband. The difference will be described below.

As in the above-mentioned embodiment, the brake ECU 6 estimates the hysteresis amount. The brake ECU 6 corrects the pressure gradient (desired amount of change in the servo pressure per predetermined time) of the servo pressure based on the estimated hysteresis amount (that is, the amount of change in the servo pressure that changes at switching to the holding control), and the difference between the actual servo pressure and the target pressure. When the suppression control is not performed, the pressure gradient of the servo pressure is calculated by mapping or calculation based on the difference between the actual servo pressure and the target pressure. In Third embodiment, the pressure gradient calculated based on the difference between the actual servo pressure and the target pressure is further corrected based on the hysteresis amount.

A correction pressure gradient may be found by substituting "the difference between the actual servo pressure and the target pressure" and "the hysteresis amount" into the previously set relationship among "the difference between the actual servo pressure and the target pressure", "the hysteresis amount", and "the pressure gradient". As the difference is larger and the hysteresis amount is smaller, overshoot or undershoot is harder to occur, and the pressure gradient can be made large in this state. Conversely, as the difference is smaller and the hysteresis amount is larger, overshoot or undershoot is easier to occur, and the pressure gradient must be made small in this state. Alternatively, when the difference is the same as the hysteresis amount, overshoot or undershoot occurs unless the pressure gradient is set to 0.

From this aspect, the brake ECU 6 previously stores a map that can derive the "pressure gradient" causing no overshoot or undershoot from "the difference between the actual servo pressure and the target pressure" and "the hysteresis amount". By estimating the hysteresis amount and finding the difference between the actual servo pressure and the target pressure, the pressure gradient that suppresses overshoot or undershoot can be set (corrected).

When the pressure gradient of the servo pressure is set, the pilot pressure that changes per predetermined time is determined. The brake ECU 6 controls the pressure decrease valve 41 or the pressure increase valve 42 (that is, controls the amount of operating fluid inputted to and outputted from the first pilot chamber 4D) based on the changed pilot pressure. This can suppress overshoot or undershoot.

Fourth Embodiment

A vehicle control unit in Fourth embodiment is different from the vehicle control units in the above-mentioned embodiments, in which the hysteresis amount is estimated based on "the FB current of the pressure decrease valve 41 or the pressure increase valve 42" and "the difference between the actual servo pressure and the accumulator pressure or the atmospheric pressure". The difference will be described below.

The brake ECU 6 finds the FB current from the application current to the pressure increase valve 42 during pressure increase, and from the application current to the pressure decrease valve 41 during pressure decrease. The application current is, as described above, a sum of a valve opening current and the FB current. The valve opening current is determined based on the pilot pressure estimated from the servo pressure (value of the pressure sensor 74), and the difference between the servo pressure and the accumulator pressure (during pressure increase) or the atmospheric pressure (during pressure decrease). Therefore, the brake ECU 6 can calculate the FB current from each measured value. The FB current depends on the flow rate to be outputted from the regulator 44. That is, the FB current increases as the set pressure gradient of the servo pressure increases.

The outflow rate (FB current) of the regulator 44 depends on the distance between the ball valve 442 and the valve seat 444 (degree of opening), that is, the stroke of the control piston 445. A passage resistance between the ball valve 442 and the valve seat 444 is found from the outflow rate (FB current) of the regulator 44, and the difference between the servo pressure and the accumulator pressure, and the passage resistance can be converted into the stroke of the control piston 445. That is, the stroke of the control piston 445 can be found from the FB current by inverse operation. The brake ECU 6 sets a value that can be calculated based on the FB current to the stroke-related value. Then, the hysteresis amount can be estimated based on the stroke and the stiffness of the damper device Z (damper chamber). In the suppression control, target to be controlled after calculation of the hysteresis amount may be the deadband or the pressure gradient as in the above-mentioned embodiment. This can achieve the same effect as described.

Other Embodiments

The present invention is not limited to the above-mentioned embodiments. For example, the stroke-dependent term estimation expression only needs to include an expression that is proportional to the difference between the pilot pressure and the servo pressure, and is inversely proportional to the difference between the accumulator pressure and the servo pressure. For example, using an expression with a root in a denominator in the stroke-dependent term estimation expression omitted (removed), the stroke-dependent term can be estimated at a certain accuracy. The pilot pressure may not be estimated, but directly measured. For example, a pressure sensor may be provided in the pipe 421, and a measurement value of the pressure sensor may be the pilot pressure. The hysteresis amount may be estimated without taking the resistance-dependent term into account. However, as in the above-mentioned embodiment, the estimation accuracy is improved by taking the resistance-dependent term into account.

Figure 5:
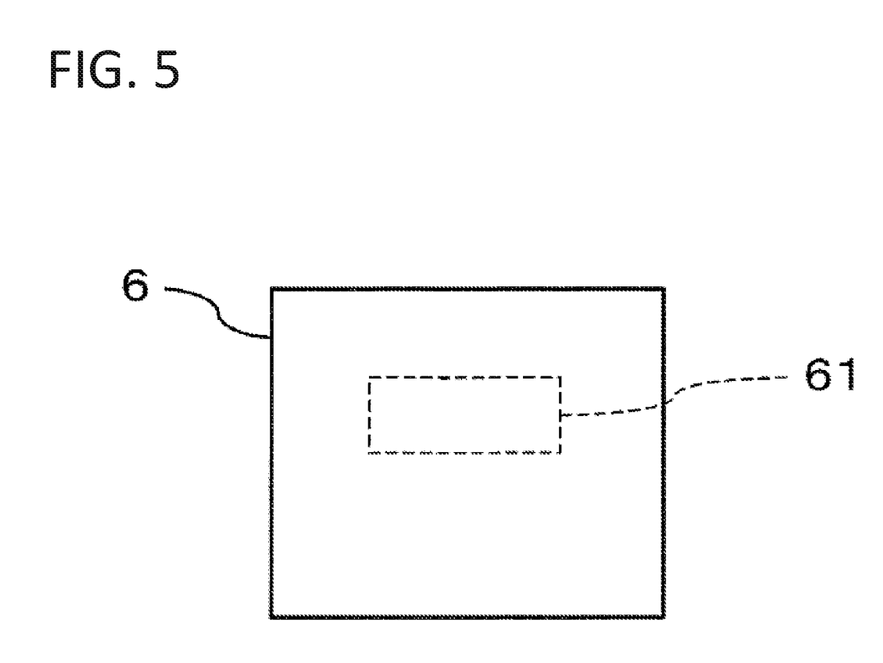
FIG. 5 is a configuration diagram illustrating configuration of a brake ECU 6 in this embodiment.

As illustrated in FIG. 5, in the above-mentioned embodiment, it can be said that the brake ECU 6 includes a hysteresis amount estimation portion 61 that estimates the hysteresis amount based on the stroke-related value, or a stroke estimation portion 61 that estimates the stroke based on the stroke-related value.

The brake ECU 6 may also calculate the stroke-related value based on the pressure gradient of the servo pressure (measured by the pressure sensor 74) and the flow rate of the brake fluid inputted to the wheel cylinders 541 to 544 (consumption property of the brake fluid on the wheel cylinders 541 to 544). The flow rate (cc/s) of the brake fluid outputted from the regulator 44 may be calculated based on the pressure gradient of the servo pressure, and the flow rate, which is found from a change in the wheel pressure and the consumption property. Then, the distance (degree of opening) between the ball valve 442 and the valve seat 444, which is necessary for achieving the flow rate of the brake fluid, and the differential pressure (difference between the accumulator pressure and the servo pressure) can be calculated. This can calculate the stroke (stroke-related value) of the control piston 445. In this case, the same effects as in the above-mentioned embodiments can be achieved.

REFERENCE SIGNS LIST

1: Master cylinder, 11: Main cylinder, 12: Cover cylinder, 13: Input piston, 14: First master piston, 15: Second master piston, 1A: Servo chamber (output chamber), 1B: First fluid pressure chamber, 1C: Second fluid pressure chamber, 1D: First master chamber, 1E: Second master chamber, 10: Brake pedal, 171: Reservoir (Low pressure source), 2: Reaction force generator, 22: First control valve, 3: Second control valve, 4: Servo pressure generator, 41: Pressure decrease valve (Valve unit, pressure decrease electromagnetic valve), 42: Pressure increase valve (Valve unit, Pressure increase electromagnetic valve), 431: Accumulator (High pressure source), 44: Regulator (Pressure adjustment unit), 445: Control piston (piston), 4D: First pilot chamber (Pilot chamber), 541, 542, 543, 544: Wheel cylinder, 5FR, 5FL, 5RR, 5RL: Wheel, 6: Brake ECU (Control unit), 71: Stroke sensor, 72: Brake stop switch, 73, 74, 75, 76: Pressure sensor, Z: Damper device

The invention claimed is:

1. A vehicle braking device comprising:
a pressure adjustment unit that outputs an output pressure corresponding to a pilot pressure inputted to a pilot chamber to an output chamber;
a valve unit that adjusts pressure or flow rate of fluid inputted to and outputted from the pilot chamber; and
a control unit that controls the valve unit according to a braking operation, wherein
the pressure adjustment unit has a piston driven by a difference between a force corresponding to the pilot pressure and a force corresponding to the output pressure,
the control unit estimates a hysteresis amount on the basis of a stroke-related value regarding an amount of movement of the piston, and controls the valve unit on the basis of the estimated hysteresis amount, wherein the hysteresis amount is an amount of change in the output pressure that changes even after switching from pressure increase control or pressure decrease control to holding control of the output pressure, and
wherein the control unit sets a range of a deadband with respect to a target pressure of the output pressure on the basis of the estimated hysteresis amount.

2. The vehicle braking device according to claim 1, further comprising:
a high pressure source that stores a predetermined range of fluid pressure; and
a low pressure source that stores a fluid pressure lower than the fluid pressure stored in the high pressure source, wherein
the valve unit has a pressure increase electromagnetic valve that adjusts flow rate of fluid inputted from the high pressure source into the pilot chamber, and a pressure decrease electromagnetic valve that adjusts flow rate of fluid outputted from the pilot chamber to the low pressure source, and
the stroke-related value includes the pilot pressure, the output pressure, pressure of the high pressure source, and stiffness of the pilot chamber.

3. The vehicle braking device according to claim 1, further comprising:
a high pressure source that stores a predetermined range of fluid pressure; and
a low pressure source that stores a fluid pressure lower than the fluid pressure stored in the high pressure source, wherein
the valve unit has a pressure increase electromagnetic valve that adjusts flow rate of fluid inputted from the high pressure source into the pilot chamber, and a pressure decrease electromagnetic valve that adjusts flow rate of fluid outputted from the pilot chamber to the low pressure source, and
the control unit calculates the stroke-related value by a relational expression that is proportional to a difference between the pilot pressure and the output pressure and is inversely proportional to a difference between pressure of the high pressure source and the output pressure.

4. The vehicle braking device according to claim 2, wherein the control unit calculates the pilot pressure by multiplying the output pressure by a predetermined pressure ratio.

5. The vehicle braking device according to claim 2, wherein the control unit calculates the pilot pressure based on an application current applied to the pressure increase electromagnetic valve or the pressure decrease electromagnetic valve.

6. The vehicle braking device according to claim 1, further comprising:
a high pressure source that stores a predetermined range of fluid pressure; and
a low pressure source that stores a fluid pressure lower than the fluid pressure stored in the high pressure source, wherein
the valve unit has a pressure increase electromagnetic valve that adjusts flow rate of fluid inputted from the high pressure source into the pilot chamber, and a pressure decrease electromagnetic valve that adjusts flow rate of fluid outputted from the pilot chamber to the low pressure source, and
the control unit calculates the stroke-related value based on a feedback current applied to the pressure increase electromagnetic valve or the pressure decrease electromagnetic valve.

7. The vehicle braking device according to claim 1, wherein the control unit calculates the stroke-related value based on pressure gradient of the output pressure and consumption property of the brake fluid.

8. The vehicle braking device according to claim 1, wherein the control unit estimates a sliding resistance of the piston based on actual pressure of the output pressure, and estimates an amount of change in the output pressure based on the sliding resistance.

9. The vehicle braking device according to claim 1, wherein the control unit sets a pressure gradient of the output pressure required by the valve unit on the basis of the estimated hysteresis amount.

10. A vehicle braking device comprising:
a pressure adjustment unit that outputs an output pressure corresponding to a pilot pressure inputted to a pilot chamber to an output chamber;
a valve unit that adjusts pressure or flow rate of fluid inputted to and outputted from the pilot chamber;
a control unit that controls the valve unit according to a braking operation;
the pressure adjustment unit comprising a piston driven by a difference between a force corresponding to the pilot pressure and a force corresponding to the output pressure; and
the control unit estimating, based on a stroke-related value indicating an amount of movement of the piston during a pressure increase control or a pressure decrease control of the output pressure, a maximum amount of change in the output pressure that changes even after switching from the pressure increase control or the pressure decrease control to holding control of the output pressure, and controlling the valve unit on the basis of the estimated amount of change n the output pressure, wherein the control unit sets a deadband with respect to a target pressure of the output pressure on the basis of the estimated amount of change in the output pressure.

11. The vehicle braking device according to claim 10, further comprising:
a high pressure source that stores a predetermined range of fluid pressure; and
a low pressure source that stores a fluid pressure lower than the fluid pressure stored in the high pressure source, wherein
the valve unit has a pressure increase electromagnetic valve that adjusts flow rate of fluid inputted from the high pressure source into the pilot chamber, and a pressure decrease electromagnetic valve that adjusts flow rate of fluid outputted from the pilot chamber to the low pressure source, and
the stroke-related value includes the pilot pressure, the output pressure, pressure of the high pressure source, and stiffness of the pilot chamber.

12. The vehicle braking device according to claim 10, further comprising:
a high pressure source that stores a predetermined range of fluid pressure; and
a low pressure source that stores a fluid pressure lower than the fluid pressure stored in the high pressure source, wherein
the valve unit has a pressure increase electromagnetic valve that adjusts flow rate of fluid inputted from the high pressure source into the pilot chamber, and a pressure decrease electromagnetic valve that adjusts flow rate of fluid outputted from the pilot chamber to the low pressure source, and
the control unit calculates the stroke-related value by a relational expression that is proportional to a difference between the pilot pressure and the output pressure and is inversely proportional to a difference between pressure of the high pressure source and the output pressure.

13. The vehicle braking device according to claim 11, wherein the control unit calculates the pilot pressure by multiplying the output pressure by a predetermined pressure ratio.

14. The vehicle braking device according to claim 11, wherein the control unit calculates the pilot pressure based on an application current applied to the pressure increase electromagnetic valve or the pressure decrease electromagnetic valve.

15. The vehicle braking device according to claim 10, further comprising:
a high pressure source that stores a predetermined range of fluid pressure; and
a low pressure source that stores a fluid pressure lower than the fluid pressure stored in the high pressure source, wherein
the valve unit has a pressure increase electromagnetic valve that adjusts flow rate of fluid inputted from the high pressure source into the pilot chamber, and a pressure decrease electromagnetic valve that adjusts flow rate of fluid outputted from the pilot chamber to the low pressure source, and
the control unit calculates the stroke-related value based on a feedback current applied to the pressure increase electromagnetic valve or the pressure decrease electromagnetic valve.

16. The vehicle braking device according to claim 10, wherein the control unit calculates the stroke-related value based on pressure gradient of the output pressure and consumption property of the brake fluid.

17. The vehicle braking device according to claim 10, wherein the control unit estimates a sliding resistance of the piston based on actual pressure of the output pressure, and estimates an amount of change in the output pressure based on the sliding resistance.

18. The vehicle braking device according to claim 10, wherein the control unit sets a pressure gradient of the output pressure required by the valve unit on the basis of the estimated amount of change in the output pressure.

* * * * *